US007077558B2

(12) United States Patent
Bodenstorfer (10) Patent No.: US 7,077,558 B2
(45) Date of Patent: *Jul. 18, 2006

(54) DOUGH TREATMENT FACILITY

(75) Inventor: Ferdinand Bodenstorfer, Vienna (AT)

(73) Assignee: Werner & Pfleiderer Lebensmitteltechnik GmbH, Dinkelsbuhl (DE)

( * ) Notice: Subject to any disclaimer, the term of this patent is extended or adjusted under 35 U.S.C. 154(b) by 104 days.

This patent is subject to a terminal disclaimer.

(21) Appl. No.: 10/778,049

(22) Filed: Feb. 17, 2004

(65) Prior Publication Data

US 2005/0128862 A1    Jun. 16, 2005

(30) Foreign Application Priority Data

Feb. 15, 2003    (DE) ................. 103 06 438

(51) Int. Cl.
    *A23L 1/00*    (2006.01)
(52) U.S. Cl. .............. 366/76.8; 99/450.1; 99/486; 366/76.7; 366/76.9; 366/77
(58) Field of Classification Search .......... 99/386, 99/443 R, 443 C, 494, 486, 352–355, 450.1–450.8; 425/202–204, 321, 339, 333, 363, 145, 147, 425/233–238; 366/76.5–76.9, 77, 143, 91, 366/92; 426/19, 27, 502–504, 231–233
See application file for complete search history.

(56) References Cited

U.S. PATENT DOCUMENTS

| 4,013,275 A | * | 3/1977 | Schroder et al. .......... 366/76.8 |
| 4,177,030 A | * | 12/1979 | Seiling ..................... 425/238 |
| 4,580,903 A | * | 4/1986 | Ihler et al. ................ 366/76.9 |
| 5,007,820 A | * | 4/1991 | Schwab et al. ........... 425/333 |
| 5,158,785 A | * | 10/1992 | Konig ....................... 425/233 |
| 5,182,124 A | * | 1/1993 | Kageyama et al. ......... 426/19 |
| 5,441,342 A | * | 8/1995 | Konig et al. ............. 366/76.7 |
| 5,486,048 A | * | 1/1996 | Konig ...................... 366/76.8 |
| 5,593,712 A | * | 1/1997 | Poilane ...................... 426/19 |
| 5,775,804 A | * | 7/1998 | Meier ...................... 366/76.8 |
| 5,862,743 A | * | 1/1999 | Cimenti ................... 99/450.2 |
| 5,993,187 A | * | 11/1999 | Manser et al. ............ 425/202 |
| 6,883,954 B1 | * | 4/2005 | Rothammel et al. ....... 366/76.8 |

* cited by examiner

Primary Examiner—Timothy F. Simone
(74) *Attorney, Agent, or Firm*—Browdy and Neimark, PLLC (57) ABSTRACT

A dough treatment facility comprises, among other things, a dough kneading arrangement, which comprises an inner kneading drum, an outer kneading drum which is moved in relation thereto within the scope of a kneading motion, and a plurality of kneading compartments which are at least partially defined by the kneading drums. The kneading motion is actuated by means of a kneading drive. This drive comprises a first drive component for rotation of the inner kneading drum, a second drive component for rotation of the outer kneading drum, and a third drive component for periodic motion of the outer kneading drum relative to the inner kneading drum, this motion having a motional component parallel to the longitudinal axis of the kneading drums. A kneading drive gear actuates the driving motions of the three drive components, derived from the motion of a single transmission shaft. The result is an easily adjustable kneading drive which can be adapted in particular to the size of the kneading compartments, the size of the dough pieces or the dough recipe.

7 Claims, 7 Drawing Sheets

DOUGH TREATMENT FACILITY

BACKGROUND OF THE INVENTION

1. Field of the Invention

The invention relates to a dough treatment facility, comprising a dough kneading arrangement in which an outer kneading drum is moved in relation to an inner kneading drum within the scope of a kneading motion.

2. Background Art

A dough treatment facility of the generic type is known through public prior use. In this case, the kneading motion features a motion of the two kneading drums relative to each other that is permanently given so that the kneading motion is the same even when dough pieces of varying weight or recipe are worked by the dough treatment facility. The same kneading motion is used even with varying diameters of kneading compartments of the dough kneading arrangement. For a certain size of the kneading compartments or for a certain size or recipe of dough pieces, this kneading motion obtains good round-kneading results. However, deviations in the size of kneading compartments or in the size or recipe of dough pieces will lead to deterioration of these results.

SUMMARY OF THE INVENTION

It is an object of the present invention to improve a dough treatment facility of the type mentioned at the outset.

According to the invention, this object is attained in a dough treatment facility which comprises a dough feeder; a dough metering arrangement; a dough kneading arrangement, which comprises an inner kneading drum, an outer kneading drum, which is disposed coaxially thereof and moved in relation thereto within the scope of a kneading motion, and a plurality of kneading compartments, which are at least partially defined by the kneading drums, with the kneading motion of the dough kneading arrangement being actuated by a kneading drive; a transfer arrangement, which transfers a metered dough piece from the dough metering arrangement to the dough kneading arrangement; and a dough discharge arrangement; wherein the kneading drive comprises: a first drive component, which sets the inner kneading drum rotating about its longitudinal axis; a second drive component, which sets the outer kneading drum rotating about its longitudinal axis; a third drive component, which periodically actuates a motion of the outer kneading drum relative to the inner kneading drum, this motion having a motional component parallel to the longitudinal axis of the kneading drums; with a kneading drive gear being provided, which actuates the motions of the third drive component, derived from the motion of a transmission shaft that actuates at least one of the two other drive components.

The kneading drive gear actuates the driving motions of the three drive components, derived from the motion of a single transmission shaft. The result is an easily adjustable kneading drive which can be adapted in particular to the size of the kneading compartments, the size of the dough pieces or the dough recipe. Coordination of the various drive components enables for example some circular motion of the kneading drums relative to each other to take place at the place of the kneading compartments and correspondingly efficient kneading. Other motional modes can be given by variation of the varying motional components of the kneading motion.

An adjusting device for adjustment of the motional stroke of the motional component of the motion of the kneading drums relative to each other and parallel to their longitudinal axis offers for example the possibility of adjusting the radius of the above-mentioned circular motion. This will help compensate in particular any modifications in the demands made on kneading, these modifications being caused by modification of the size of the kneading compartments.

An eccentric shaft which, at the driven end, is allocated to the third drive component offers a simple possibility of providing a motional component parallel to the longitudinal axis of the kneading drums.

An adjusting device designed for adjusting the eccentric stroke of the first eccentric shaft can easily be put into practice.

An adjusting device can be accommodated compactly in, or in the vicinity of, the kneading drive gear, when comprising a second eccentric shaft, which is coupled with the first eccentric shaft and the axis of rotation of which is parallel to, and spaced from, the axis of rotation of the first eccentric shaft; an adjusting unit for adjustment of the distance of the first eccentric shaft from the longitudinal axis of a gear shaft of the kneading drive gear by the gear shaft being pivoted about the second eccentric shaft, with the gear shaft being connected, via the first eccentric shaft, to the third drive component.

A possibility of automatic adjustment of the relative motion in the kneading motion in dependence on the sense of rotation of the gear shaft is offered by an adjusting device which comprises a stop which is connected to the second eccentric shaft; the stop cooperating with two counterpart stops; the stop bearing against one of the two counterpart stops, depending on the sense of rotation of the gear shaft, with a first distance being provided between the first eccentric shaft and the longitudinal axis of the gear shaft when the stop bears against the first counterpart stop, and with a second distance, which differs from the first distance, being provided between the first eccentric shaft and the longitudinal axis of the gear shaft when the stop bears against the second counterpart stop.

Optimal use of the eccentric stroke provided by the eccentric shafts is attained in an adjusting unit, when a maximal distance is provided between the first eccentric shaft and the longitudinal axis of the gear shaft when the stop bears against the first counterpart stop; and a second minimal distance is provided between the first eccentric shaft and the longitudinal axis of the gear shaft when the stop bears against the second counterpart stop.

An exemplary embodiment of the invention will be explained in detail, taken in conjunction with the drawing.

DESCRIPTION OF A PREFERRED EMBODIMENT

Figure 1:
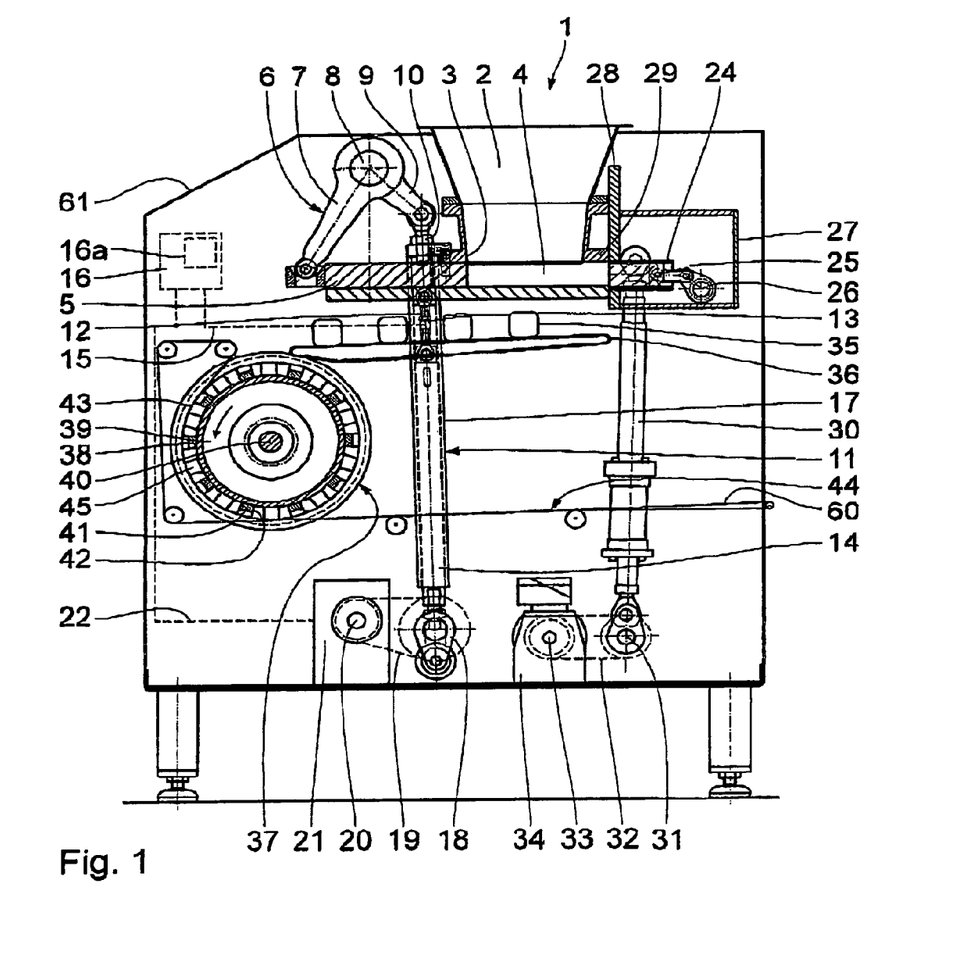
FIG. 1 is an instantaneous, sectional view of the dough treatment facility in a dough suck-in phase.

A dough treatment facility 1 serves for dough portioning and kneading for example in the production of rolls. To this end, dough is filled into a feed hopper 2. A bottom outlet 3 of the feed hopper 2 is connected to a delivery chamber 4 where a delivery piston 5 extends horizontally. The horizontal delivery motion of the delivery piston 5 is actuated by a crank drive 6. To this end, a first lever arm 7 is articulated to an end of the delivery piston 5 that faces away from the delivery chamber 4; by its other end, the lever arm 7 is non-rotatably joined to a pivoted shaft 8. A second lever arm 9 is non-rotatably connected to the pivoted shaft 8; by its other end, the lever arm 9 is articulated to a first connecting-rod section 10 of a connecting rod 11. By way of a link 12 which comprises a load cell 13, the first connecting-rod section 10 is articulated to a second connecting-rod section 14. The load cell 13 is disposed in the link 12 in such a way that the pressure that the two connecting-rod sections 10, 14 exercise on each other during a delivery motion of the delivery piston 5 can be measured be means of the load cell 13. Via a signal line 15, the load cell 13 is connected to a control unit 16. The control unit 16 comprises a rewritable memory 16a.

Load cells of the type of the load cell 13 are commercial. The change in shape of the load cell 13 is indicative of the pressure that acts on it. This change of shape can be measured capacitively, inductively or by measurement of a change of electric resistance, for example by wire strain gauges.

The two connecting-rod sections 10, 14 and the link 12, together with the load cell 13, are guided in a connecting-rod casing 17. The end of the second connecting-rod section 14 that is turned away from the link 12 is articulated to a crank shaft 18 which is driven via a driving chain 19 by a drive shaft 20 of a delivery-piston driving motor 21. Via a control line 22, the control unit 16 is connected to the motor 21.

Figure 2:
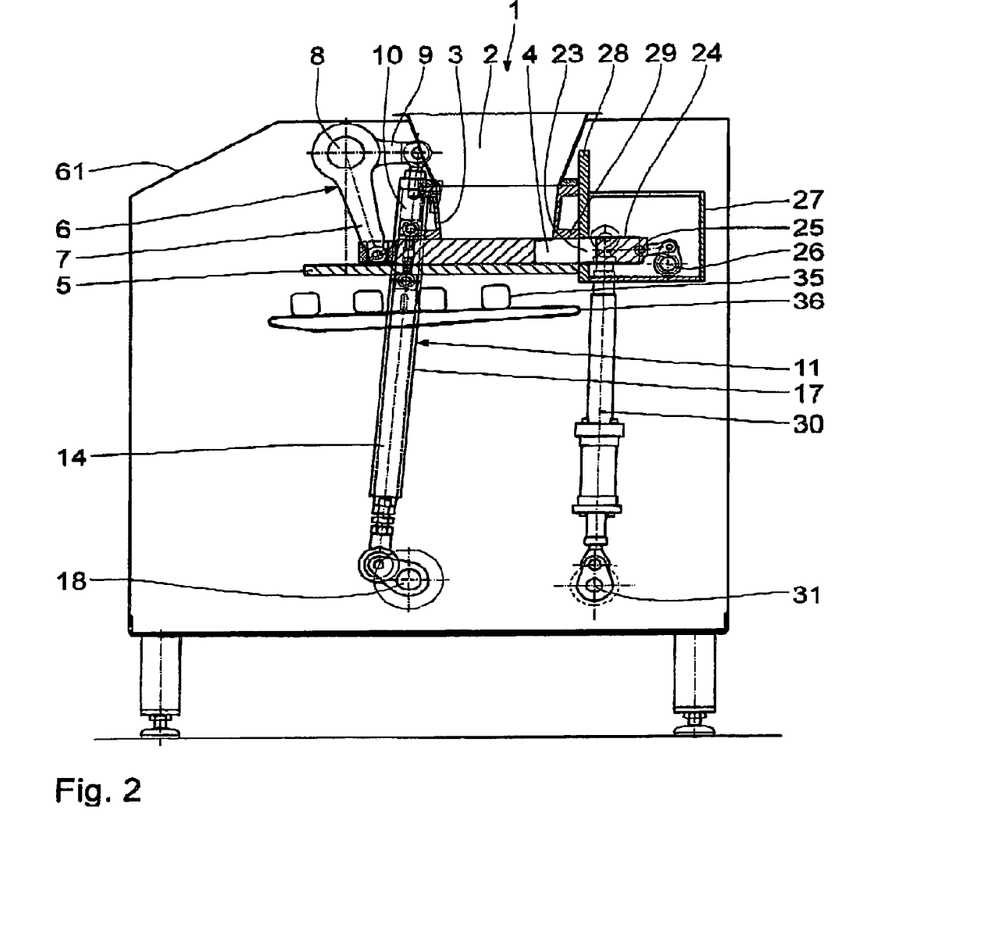
FIGS. 2 and 3 are instantaneous views, similar to FIG. 1, of the dough treatment facility in a dough fill-in phase and in a dough discharge phase with a dough kneading arrangement and a dough discharge arrangement as well as some other details of the dough treatment facility according to FIG. 1 not being shown.
Figure 3:
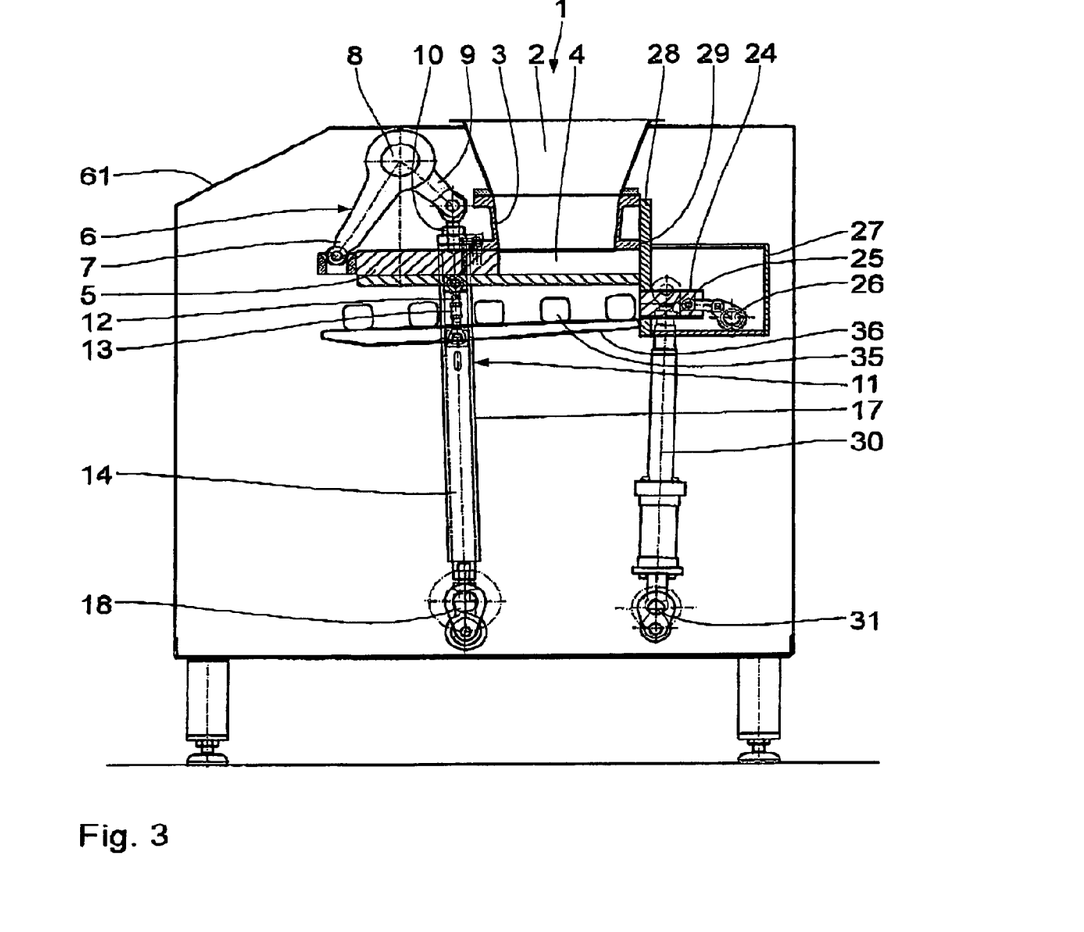
Figure 4:
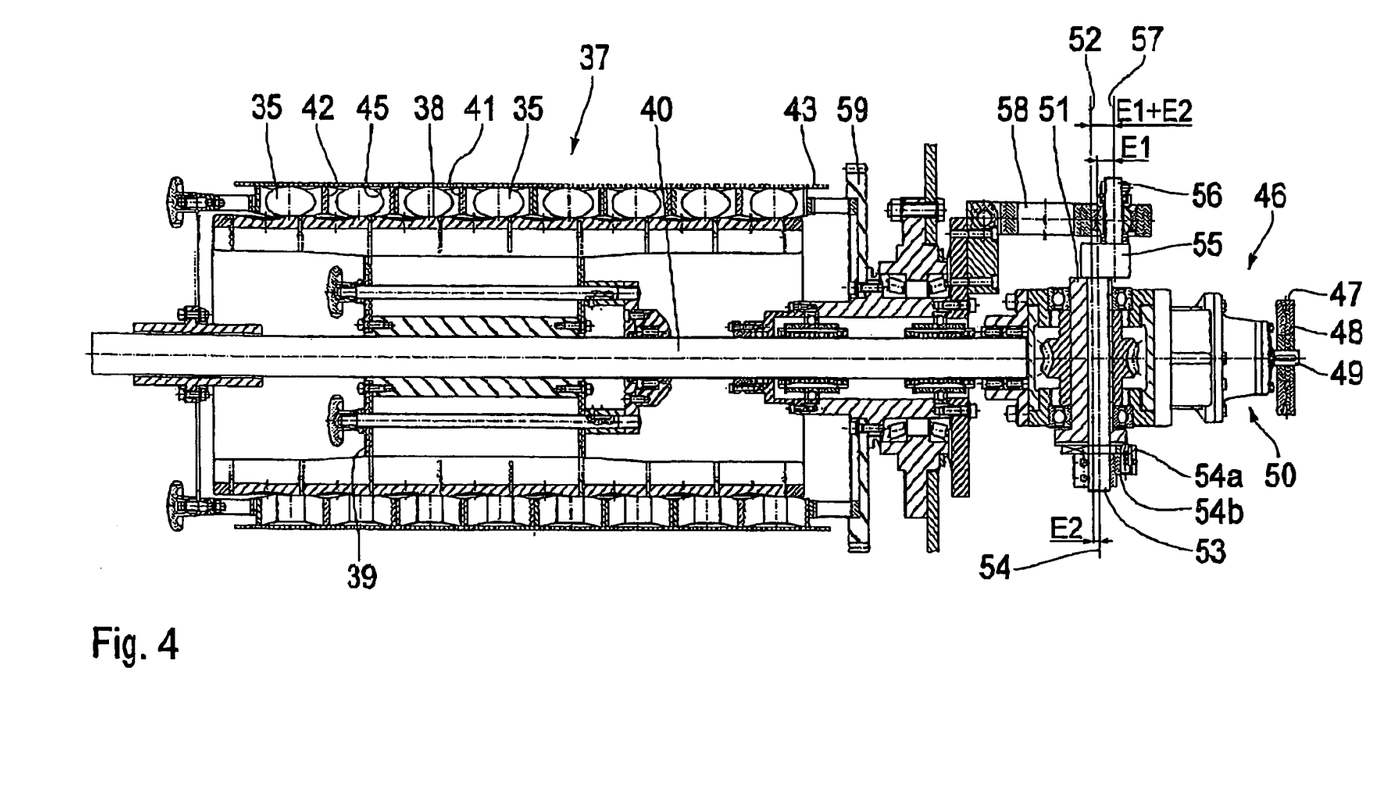
FIG. 4 is a longitudinal sectional view of the dough kneading arrangement of the dough treatment facility with a maximal distance between the axis of a first eccentric shaft and a gear shaft of a kneading drive gear.
Figure 5:
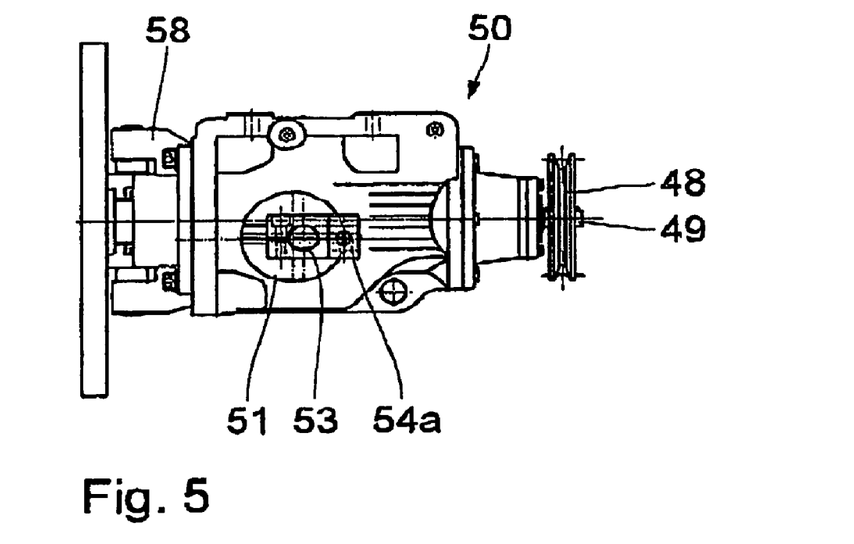
FIG. 5 is a first side view of a kneading drive gear of the dough kneading arrangement seen in a direction towards the bottom side, in FIG. 4, of the kneading drive gear.
Figure 6:
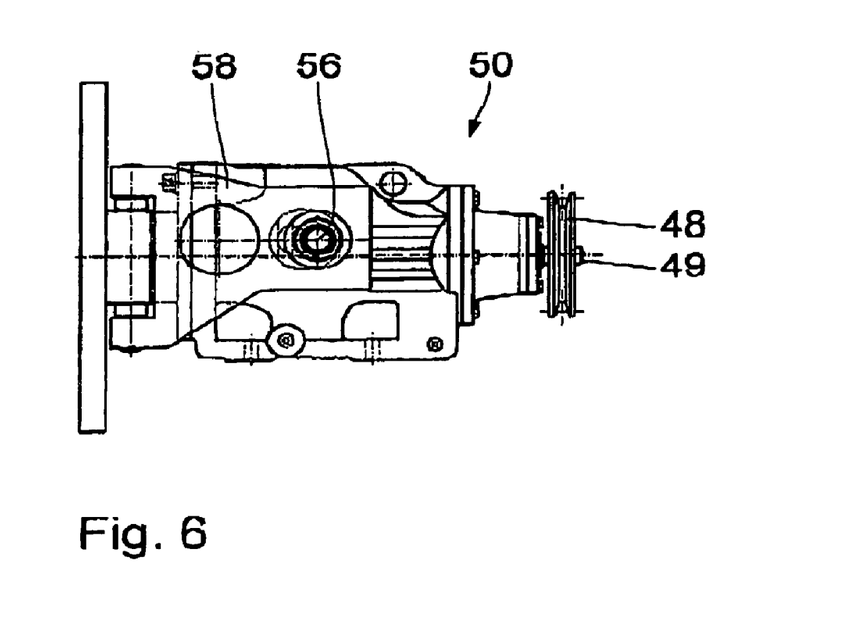
FIG. 6 is another side view of the kneading drive gear seen in a direction towards a top side, in FIG. 4, of the kneading drive gear.

In the delivery chamber 4, the dough is pressed against metering chambers 23 by the delivery piston 5 which is moved to the right in FIGS. 1 to 3; the casing walls of the metering chambers 23 are formed by metering cylinders 24. The metering chambers 23 continue the delivery chamber 4 to the right in FIGS. 1 to 3. On the side turned away from the delivery piston 5, the metering chambers 23 are defined by metering pistons 25. In the dough treatment facility 1, several metering units, each comprised of a metering chamber 23, a metering cylinder 24 and a metering piston 25, are disposed one after the other vertically of the plane of projection of FIGS. 1 to 3. For description of the dough treatment facility, it will do to specify a single metering unit, the other metering units being configured identically. By its end that faces away from the delivery chamber 4, the metering piston 25 is mounted on a metering crank shaft 26 which is driven in a manner not shown in FIGS. 1 to 3. A metering stroke of the metering pistons 25 can be set by way of the pivoting angle of the metering crank shaft 26, it being possible in this way to attain a desired volume of metered dough pieces.

The metering units are disposed in a flat-slide box 27, the vertical slide wall 28 of which rests flush on front-wall sections of a supporting section 29 of the dough treatment facility 1, the supporting section 29 defining the delivery chamber 4 and guiding the delivery piston 5. For dough portioning, the flat-slide box 27 is displaceable along the vertical guide of the slide wall 28 on the supporting section 29. To this end, the flat-slide box 27 is articulated to a flat-slide-box connecting rod 30 which, by its other end, is articulated to a flat-slide-box crank shaft 31. The crank shaft 31 is driven via a driving chain 32 by a drive shaft 33 of a flat-slide-box driving motor 34.

FIGS. 1 to 3 illustrate the metering of dough pieces 35 by means of the dough treatment facility 1. FIG. 1 shows the dough treatment facility 1 in a dough suck-in phase, with the delivery piston 5 completely retracted to the left and the metering pistons 25 taking a position displaced to the left, in which their piston walls are flush with the surface, turned toward the delivery chamber 4, of the slide wall 28. FIG. 2 illustrates the dough treatment facility 1 during a dough fill-in phase, in which the dough that has been sucked in is compacted by the delivery piston 5 moving to the right and pressed in the direction of the metering chambers 23. In the process, the metering pistons 25 are displaced to the right in the metering cylinders 24 by a metering stroke that is given via the metering crank shaft 26 so that a desired volume of dough can collect in the metering chambers 23.

The pressure by which the delivery piston 5, during the dough fill-in phase, acts on the compacted dough in the delivery chamber 4 and the metering chambers 23 is measured by the load cell 13 and transmitted via the signal line 15 to the control unit 16. This is where the measured pressure is compared to a limit recorded in the memory 16a of the control unit 16. When the pressure measured by the load cell 13 has reached the pressure limit, the process of insertion of dough into the metering chambers 23 by the delivery piston 5 is concluded and the delivery piston 5 is stopped for example in the position of FIG. 2, which is controlled by the control unit 16 via the control line 22. The pressure limit recorded in the control unit 16 is suited in particular to the dough recipe and also to the portioned quantity. Of course, the pressure which the delivery piston 5 exerts on the dough during the dough filling phase can basically be measured at any load transmission element between the delivery-piston driving motor 21 and the delivery piston 5. Depending on the dough recipe that is worked in the dough treatment facility 1, a user can select a pressure limit from a plurality of pressure limits recorded in the memory 16a.

After the dough fill-in phase, the flat-slide box 27 is moved downwards into the position according to FIG. 3, which shows the dough treatment facility 1 in a dough discharge phase. After displacement of the flat-slide box 27, the metering pistons 25 are again moved into the position displaced to the left as seen in FIG. 3, thus pushing dough pieces 35 on to a transfer conveyor belt 36 which is a continuous conveyor belt deflected in a manner not shown. After passage through the three phases seen in FIGS. 1 to 3, there is a row of dough pieces 35 perpendicular to the plane of projection of FIGS. 1 to 3 on the transfer conveyor belt 36, the number of which corresponds to the number of metering units. This row of dough pieces 35 is then transported to the left on the transfer conveyor belt 36 in a direction towards a dough kneading arrangement 37.

The dough kneading arrangement 37 is specified below, taken in conjunction with FIGS. 4 to 9. It has an inner, hollow cylindrical kneading drum 38 which, via a supporting structure 39, is non-rotatably joined to a central kneading-drum shaft 40. The inner kneading drum 38 is co-axially surrounded by an outer, hollow cylindrical kneading drum 41 which is also called a compartment drum. It is arranged on the kneading drum shaft 40 for rotation about the kneading drum shaft 40 relative to the inner kneading drum 38. In a manner known per se, the outer kneading drum 41 has through holes 42. They are open outwards and inwards and they are inwards defined by the outer wall of the inner kneading drum 38. In a peripheral section of the outer kneading drum 41, the through holes 42 are outwardly defined by a kneading strand 43 of a kneader/conveyor belt 44 which rests on the outer kneading drum 41 in this peripheral section. The through holes 42, which are defined on all sides in this peripheral section, form kneading compartments 45. The kneader/conveyor belt 44 is designed as a multiply deflected continuous conveyor belt.

For kneading the dough, the inner kneading drum 38 and the outer kneading drum 41 perform a kneading motion one relative to the other which is actuated by a kneading drive that is designated in its entirety by the reference numeral 46. To this end, a kneader driving motor (not shown) acts via a transmission belt 47 on a transmission pulley 48 which is non-rotatably connected to a first transmission shaft 49. This shaft 49 is joined to a shaft at the driving end of a kneading drive gear 50.

This gear 50 translates the rotation of the transmission shaft 49 into a rotation of the kneading-drum shaft 40 which is in alignment there-with and which consequently constitutes a first drive component that sets the inner kneading drum 38 rotating about its longitudinal axis. The kneading drive gear 50 further translates the rotation of the transmission shaft 49 into a rotation of a gear shaft 51 which is disposed between the transmission shaft 49 and the kneading-drum shaft 40 and the axis of rotation 52 of which is perpendicular to the axis of rotation of the kneading-drum shaft 40. An eccentric shaft 53 runs in a bore of the gear shaft 51, its axis of rotation 54 being parallel to the axis of rotation of the gear shaft 51 and having a distance there-from that is designated by $E_2$ in FIGS. 4 and 7.

The eccentric shaft 53 is pivoted relative to the gear shaft 51 about its axis of rotation 54. This pivoting travel is defined by a stop 54a which is non-rotatably joined to the eccentric shaft 53 and cooperates with a counterpart stop 54b in the form of a step in the front wall, turned towards the stop 54a, of the gear shaft 51. Another counterpart stop 54c is also provided in the front wall of the gear shaft 51. Via an eccentric link 55, the eccentric shaft 53 is in connection with another eccentric shaft 56, the axis of rotation 57 of which is parallel to the axes of rotation 52 and 54. The distance between the axes of rotation 54, 57 of the eccentric shafts 53, 56 is designated by $E_1$ in FIG. 4. In the position of the kneading drive 46 in FIGS. 4 to 6, the eccentric shaft 56 is disposed relative to the gear shaft 51 in such a way that the axis of rotation 52 of the gear shaft 51 has the distance $E_1+E_2$ from the axis of rotation 57 of the eccentric shaft 56.

Via a ball-and-socket joint, the eccentric shaft 56 is connected to a transmission link 58 which is connected to the outer kneading drum 41 via another transmission link 59 that is mounted rotatably about the kneading-drum shaft 40.

The two transmission links 58, 59 constitute a second and a third drive component of the kneading drive 46, having the following job: On the one hand, the rotary motion of the transmission shaft 59 is translated, via the transmission links 58, 59, into a rotary motion of the outer kneading drum 41 about the kneading-drum shaft 40. The rotary motions of the two kneading drums 38, 41 about the kneading-drum shaft 40 are independent of each other. In this regard, the transmission links 58, 59 constitute a second drive component of the kneading drive 46. Furthermore, the transmission links 58, 59 also transmit a motional component of the outer kneading drum 41 relative to the inner kneading drum 38 parallel to the kneading drum shaft 40, driven by rotation of the eccentric shaft 56 about the gear shaft 51. In this regard, the transmission links 58, 59 constitute a third drive component of the kneading drive 46. The rotation of the outer kneading drum 41 about the inner kneading drum 38 and the motion of the outer kneading drum 41 relative to the inner kneading drum 38, combined with a motional component parallel to the longitudinal axis of the kneading-drum shaft 40, are coordinated in such a way that the through holes 42 and in particular the kneading compartments make a circular motion relative to the wall, defining the through holes 42, of the inner kneading drum 38 and relative to the kneading strand 43 of the kneader/conveyor belt 44. In this way the dough pieces 35 in the kneading compartments are kneaded, whereby the originally non-shaped piece of dough 35 is given a spherical shape.

Figure 7:
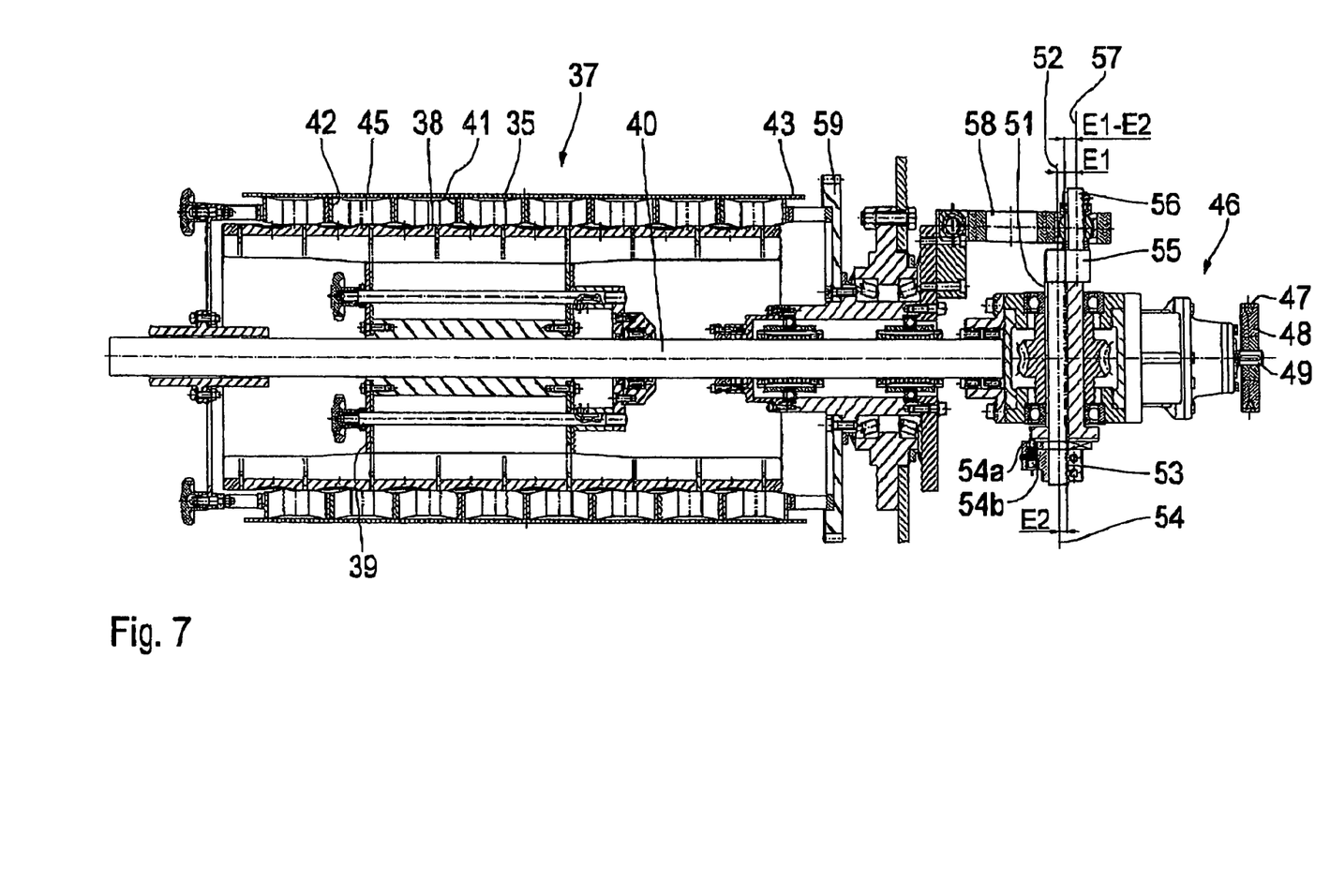
FIG. 7 is an illustration, similar to FIG. 4, of the dough kneading arrangement with a minimal distance between the axis of the first eccentric shaft and the gear shaft of the kneading drive gear.
Figure 8:
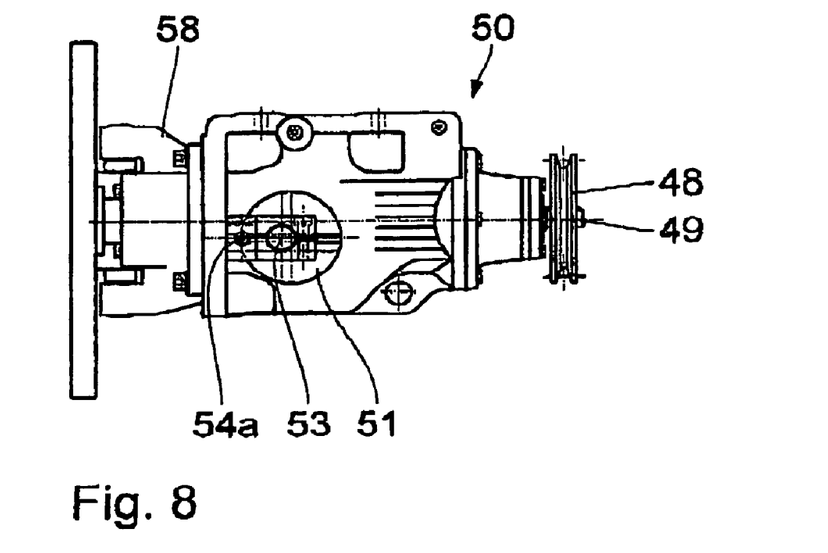
FIGS. 8 and 9 are views, similar to FIGS. 5 and 6, of the dough kneading arrangement in the position of FIG. 7.
Figure 9:
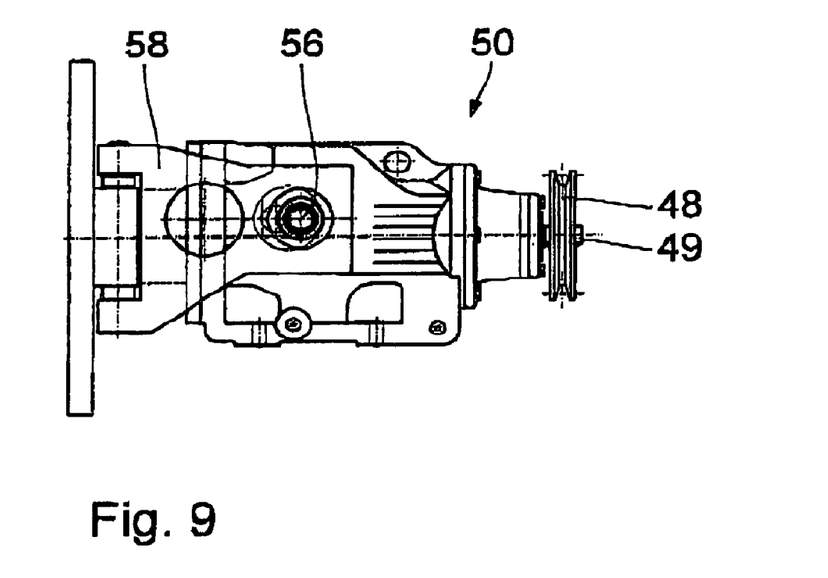

Pivoting the two eccentric shafts 53, 56 relative to each other by 180° is possible. FIG. 7 illustrates a second position of the two eccentric shafts 53, 56 relative to each other, with the stop 54a bearing against the counterpart stop 54c. The distances $E_1$ and $E_2$ are subtracted one from the other so that the axis of rotation 52 of the gear shaft 51 and the axis of rotation 57 of the eccentric shaft 56 have a distance from each other of $E_1-E_2$. Pivoting the eccentric shafts 53, 56 relative to each other between the positions of FIGS. 4 and 7 consequently reduces the eccentricity of the eccentric shaft 57 relative to the gear shaft 51 from the greater eccentricity $E_1+E_2$ to the smaller eccentricity $E_1-E_2$. The amount of the motional component of the motion of the outer kneading drum 41 relative to the inner kneading drum 38 parallel to the longitudinal axis of the kneading-drum shaft 40 decreases correspondingly. Corresponding adaptation of the rotational speeds of the inner kneading drum 38 on the one hand and of the outer kneading drum 41 on the other, helps attain a corresponding reduction of the circular kneading motion of the outer kneading drum 41 relative to the inner kneading drum 38.

The dough kneading arrangement 37 works as follows:

The sense of rotation of the transmission shaft 49 and the difference in rotational speeds between the inner kneading drum 38 on the one hand and of the outer kneading drum 41 on the other are given, depending on the weight of the dough pieces 35 and on the recipe thereof. Upon clockwise actuation of the gear shaft 51 in FIG. 5, the position of the kneading drive 46 according to FIG. 4 will be attained after half a revolution at the latest. A circular kneading motion of a greater radius can be provided in this position. If a kneading motion of a smaller radius is to be provided, the sense of rotation of the transmission shaft 49 is reversed. In this case, the gear shaft 51 also rotates in the reverse sense of rotation i.e., counter-clockwise in FIG. 8. After half a revolution at the latest, the kneading drive 46 then takes the position according to FIG. 7, in which the circular kneading motion of smaller radius is provided.

After conclusion of the kneading process, the dough pieces 35 leave the kneading compartments and are passed on to a conveyor strand 60 of the kneader/conveyor belt 44, leaving a casing 61 of the dough treatment facility 1 through a corresponding outlet.

What is claimed is:

1. A dough treatment facility (1), comprising
   a dough feeder (2);
   a dough metering arrangement (5, 23 to 27);
   a dough kneading arrangement (27), which comprises
      an inner kneading drum (38);
      an outer kneading drum (41), which is disposed coaxially thereof and moved in relation thereto within the scope of a kneading motion, and
      a plurality of kneading compartments (45), which are at least partially defined by the kneading drums (38, 41),
      with the kneading motion of the dough kneading arrangement (37) being actuated by a kneading drive (46);
   a transfer arrangement (36), which transfers a metered dough piece (35) from the dough metering arrangement (5, 23 to 27) to the dough kneading arrangement (37); and
   a dough discharge arrangement (60);
   wherein the kneading drive (46) comprises:
      a first drive component (40), which sets the inner kneading drum (38) rotating about its longitudinal axis;
      a second drive component (58, 59), which sets the outer kneading drum (41) rotating about its longitudinal axis;
      a third drive component (58, 59), which periodically actuates a motion of the outer kneading drum (41) relative to the inner kneading drum (38), this motion having a motional component parallel to the longitudinal axis of the kneading drums (38, 41);
      with a kneading drive gear (50) being provided, which actuates the motions of the third drive component (58, 59), derived from the motion of a transmission shaft (49) that actuates at least one of the two other drive components (40, 58, 59).

2. A dough treatment facility according to claim 1, comprising an adjusting device (53, 54a to 54c) for adjustment of the motional stroke of the motional component of the motion of the kneading drums (38, 41) relative to each other and parallel to their longitudinal axis.

3. A dough treatment facility according to claim 1, wherein the kneading drive gear (50) comprises at least one first eccentric shaft (56) which, at the driven end, is allocated to the third drive component (58, 59).

4. A dough treatment facility according to claim 3, wherein the adjusting device (53, 54a to 54c) is designed for adjusting the eccentric stroke of the first eccentric shaft (56).

5. A dough treatment facility according to claim 4, wherein the adjusting device (53, 54a to 54c) comprises:
   a second eccentric shaft (53), which is coupled with the first eccentric shaft (56) and the axis of rotation (54) of which is parallel to, and spaced from, the axis of rotation (57) of the first eccentric shaft (56);
   an adjusting unit (54a to 54c) for adjustment of the distance of the first eccentric shaft (56) from the longitudinal axis (52) of a gear shaft (51) of the kneading drive gear (50) by the gear shaft (51) being pivoted about the second eccentric shaft (53), with the gear shaft (51) being connected, via the first eccentric shaft (56), to the third drive component (58, 59).

6. A dough treatment facility according to claim 5, wherein the adjusting device (53, 54a to 54c) comprises:
   a stop (54a) which is connected to the second eccentric shaft (53);
   the stop (54a) cooperating with two counterpart stops (54b, 54c);
   the stop (54a) bearing against one of the two counterpart stops (54b, 54c), depending on the sense of rotation of the gear shaft (51),
      with a first distance $(E_1+E_2)$ being provided between the first eccentric shaft (56) and the longitudinal axis (52) of the gear shaft (51) when the stop (54a) bears against the first counterpart stop (54b), and
      with a second distance $(E_1-E_2)$, which differs from the first distance $(E_1+E_2)$, being provided between the first eccentric shaft (56) and the longitudinal axis (52) of the gear shaft (51) when the stop (54a) bears against the second counterpart stop (54c).

7. A dough treatment facility according to claim 6, characterized in that a maximal distance $(E_1+E_2)$ is provided between the first eccentric shaft (56) and the longitudinal axis (52) of the gear shaft (51) when the stop (54a) bears against the first counterpart stop (54b); and a second minimal distance $(E_1-E_2)$ is provided between the first eccentric shaft (56) and the longitudinal axis (52) of the gear shaft (51) when the stop (54a) bears against the second counterpart stop (54c).

* * * * *